United States Patent
Kimura et al.

(10) Patent No.: US 6,282,508 B1
(45) Date of Patent: Aug. 28, 2001

(54) DICTIONARY MANAGEMENT APPARATUS AND A DICTIONARY SERVER

(75) Inventors: Kazuhiro Kimura; Hideki Hirakawa, both of Kanagawa-ken; Akira Kumano, Chiba-ken, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/035,767

(22) Filed: Mar. 6, 1998

(30) Foreign Application Priority Data

Mar. 18, 1997 (JP) .................................................. 9-064644

(51) Int. Cl.[7] .................................................. G06F 17/21
(52) U.S. Cl. .................................................. 704/10; 707/532
(58) Field of Search .................................................. 704/1, 2, 7, 8, 704/9–10; 707/530, 531, 532, 536, 511, 500, 513, 540, 100, 104; 709/203, 201, 217–218

(56) References Cited

U.S. PATENT DOCUMENTS

| 5,530,645 | * | 6/1996 | Chu | 704/10 |
| 5,682,543 | * | 10/1997 | Shiomi | 704/10 |
| 5,721,914 | * | 2/1998 | DeVries | 707/104 |
| 5,761,649 | * | 6/1998 | Hill | 705/27 |
| 5,875,443 | * | 2/1999 | Nielsen | 707/2 |
| 5,933,837 | * | 8/1999 | Kung | 707/201 |
| 5,960,449 | * | 9/1999 | Nagaoka et al. | 707/532 |
| 5,970,492 | * | 10/1999 | Nielsen | 707/10 |
| 5,995,756 | * | 11/1999 | Herrmann | 395/712 |

FOREIGN PATENT DOCUMENTS

H05-35721    2/1993   (JP) .................................................. G06F/15/20

* cited by examiner

Primary Examiner—Patrick N. Edouard
(74) Attorney, Agent, or Firm—Finnegan, Henderson, Farabow, Garrett & Dunner, L.L.P.

(57) ABSTRACT

The dictionary management apparatus of the present invention updates each dictionary included in a plurality of language processing system. A request section requests download of dictionary data for a dictionary server according to a user's request or a predetermined condition. The dictionary server stores the dictionary data to be supplied to the language processing system. An update section updates the dictionary of the plurality of language processing system according to the dictionary data downloaded from the dictionary server. A collection section collects a user dictionary data updated in the dictionary of at least one language processing system. An upload section sends the user dictionary data collected by the collection section to the dictionary server as upload data.

21 Claims, 14 Drawing Sheets

| UPDATE FLAG | READING | HEADWORD | PART OF SPEECH |
|---|---|---|---|
| a | INPUT METHOD EDITOR | IME | NOUN |
| d | NETWORK FILE SYSTEM | NFS | NOUN |
| ⋮ | ⋮ | ⋮ | ⋮ |

*FIG. 8*

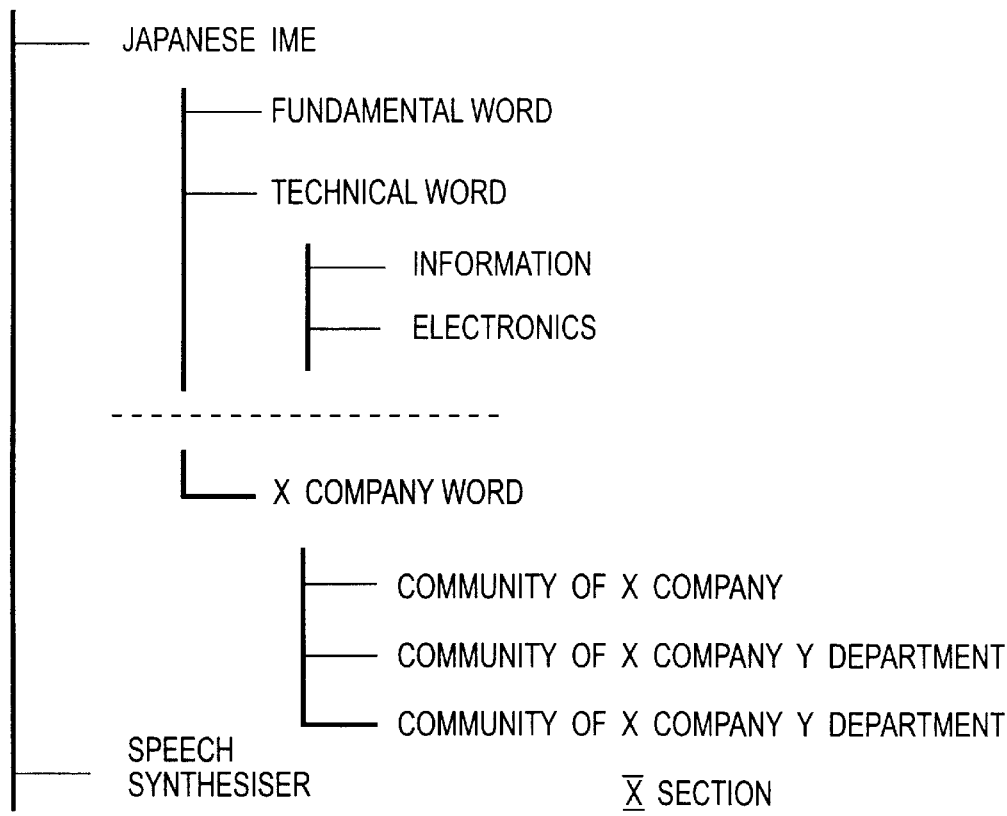

```
┌── JAPANESE IME
│       ├── FUNDAMENTAL WORD
│       ├── TECHNICAL WORD
│       │       ├── INFORMATION
│       │       └── ELECTRONICS
│       ┆
│       └── X COMPANY WORD
│               ├── COMMUNITY OF X COMPANY
│               ├── COMMUNITY OF X COMPANY Y DEPARTMENT
│               └── COMMUNITY OF X COMPANY Y DEPARTMENT
│                        X̲ SECTION
├── SPEECH
    SYNTHESISER
```

FIG. 11A

| FILE CONTENT | FILE NAME |
|---|---|
| DICTIONARY SET INFORMATION | . INFO |
| BASIC SET | 000-000 |
| BASIC SET PATCH 1 | 000-001 |
| BASIC SET PATCH 2 | 000-002 |
| ADDITION SET 1 | 001-000 |
| ADDITION SET 1 PATCH 1 | 001-001 |

FIG. 11B

DICTIONARY MANAGEMENT APPARATUS AND A DICTIONARY SERVER

FIELD OF THE INVENTION

The present invention relates to a dictionary management apparatus to update each dictionary included in a plurality of language processing system and a dictionary server to store the dictionary data to be supplied to the each dictionary.

BACKGROUND OF THE INVENTION

Recently, IME (INPUT METHOD EDITOR) to input Japanese to a computer and a machine translation system are widely used. This kind of software uses a dictionary including various language information. However, content of accomplished dictionary information is predetermined. This dictionary does not include the latest word orderly generated and vocabulary used in local community such as a company. In order to solve this problem, user registers his desired word to a user dictionary. However, registration to the user dictionary by his hand is troublesome for the user. In order to simplify this registration, following two methods are used.

(1) The dictionary item is automatically registered by the user's key input or selection information when the user inputs a document.

(2) The dictionary data is automatically extracted by analyzing the accomplished document when the user indicates the accomplished document.

In the method (1), a series of key input by the user must be recognized as an operation to input a new word not previously registered in the accomplished dictionary. This operation for the series of the key input includes many kinds of variation by the user. Therefore, in order to avoid an erroneous registration, a new word should be learned from the limited pattern of key input that is certain to reflect the intention of the new word input. As a result, the coverages of the automatic registration is restricted.

In the method (2), the document is not always correctly analized and the dictionary data as the new word is not correctly extracted from the document. Especially, in IME of Japanese input, a reading as the input key is not obtained from the document.

Accordingly, in general, the user must register his desired word by his burden to the user dictionary.

SUMMARY OF THE INVENTION

It is an object of the present invention to provide a dictionary management apparatus and a dictionary server to greatly reduce the user's load in case the new word is registered to the dictionary.

According to the present invention, there is provided a dictionary management apparatus which updates each dictionary included in a plurality of language processing system, comprising: request means for requesting download of dictionary data for a dictionary server according to a user's request or a predetermined condition, the dictionary server stores the dictionary data to be supplied to the language processing system; update means for updating the dictionary of the plurality of language processing system according to the dictionary data downloaded from the dictionary server; collection means for collecting a user dictionary data updated in the dictionary of at least one language processing system; and upload means for sending the user dictionary data collected by said collection means to the dictionary server as upload data.

Further in accordance with the present invention, there is also provided a dictionary management method for updating each dictionary included in a plurality of language processing system, comprising the steps of: requesting download of dictionary data for a dictionary server according to a user's request or a predetermined condition, the dictionary server stores the dictionary data to be supplied to the language processing system; updating the dictionary of the plurality of language processing system according to the dictionary data downloaded from the dictionary server; collecting a user dictionary data updated in the dictionary of at least one language processing system; and sending the user dictionary data collected at collecting step to the dictionary server as update data.

Further in accordance with the present invention, there is also provided a computer readable memory containing computer readable instructions to update each dictionary included in a plurality of language processing system, comprising: instruction means for causing a computer to request download of dictionary data for a dictionary server according to a user's request or a predetermined condition, the dictionary server stores the dictionary data to be supplied to the language processing system; instruction means for causing a computer to update the dictionary of the plurality of language processing system according to the dictionary data downloaded from the dictionary server; instruction means for causing a computer to collect a user dictionary data updated in the dictionary of at least one language processing system; and instruction means for causing a computer to send the user dictionary data collected to the dictionary server as update data.

Further in accordance with the present invention, there is also provided a dictionary server of each level in hierarchical structure each of which stores the dictionary data to be supplied to each dictionary included in a plurality of language processing system, comprising: first receiving means for receiving a dictionary data updated by a low level dictionary server; supply means for supplying the received dictionary data whose frequency is above a predetermined value to the dictionary of the plurality of language processing system; sending means for sending the received dictionary data whose frequency is above the predetermined value to a high level dictionary server, and second receiving means for receiving a dictionary data sent by the high level dictionary server, the received dictionary data being referred to determine the dictionary data to be supplied.

Further in accordance with the present invention, there is also provided a method for controlling a dictionary server of each level in hierarchical structure each of which stores the dictionary data to be supplied to each dictionary included in a plurality of language processing system, comprising the steps of: receiving a dictionary data updated by a low level dictionary server; supplying the received dictionary data whose frequency is above a predetermined value to the dictionary of the plurality of language processing system; sending the received dictionary data whose frequency is above the predetermined value to a high level dictionary server; and receiving a dictionary data sent by the high level dictionary server, the received dictionary data being referred to determine the dictionary data to be supplied.

Further in accordance with the present invention, there is also provided a computer readable memory containing computer readable instructions to control a dictionary server of each level in hierarchical structure each of which stores the dictionary data to be supplied to each dictionary included in a plurality of language processing system, comprising: instruction means for causing a computer to receive a dictionary data updated by a low level dictionary server; instruction means for causing a computer to supply the received dictionary data whose frequency is above a predetermined value to the dictionary of the plurality of language processing system; instruction means for causing a computer to send the received dictionary data whose frequency is above the predetermined value to a high level dictionary server; and instruction means for causing a computer to receive a dictionary data sent by the high level dictionary server, the received dictionary data being referred to determine the dictionary data to be supplied.

BRIEF DESCRIPTION OF THE DRAWINGS

FIG. 8 is a schematic diagram of an example of data structure of the dictionary update data sent from the dictionary server to the dictionary use system.

FIG. 11A is a schematic diagram of a construction example of a file system for the dictionary update data.

FIG. 11B is a schematic diagram of a memory example of the dictionary update data and the dictionary set information in leaf directory of the file system.

DETAILED DESCRIPTION OF THE PREFERRED EMBODIMENT

Figure 1:
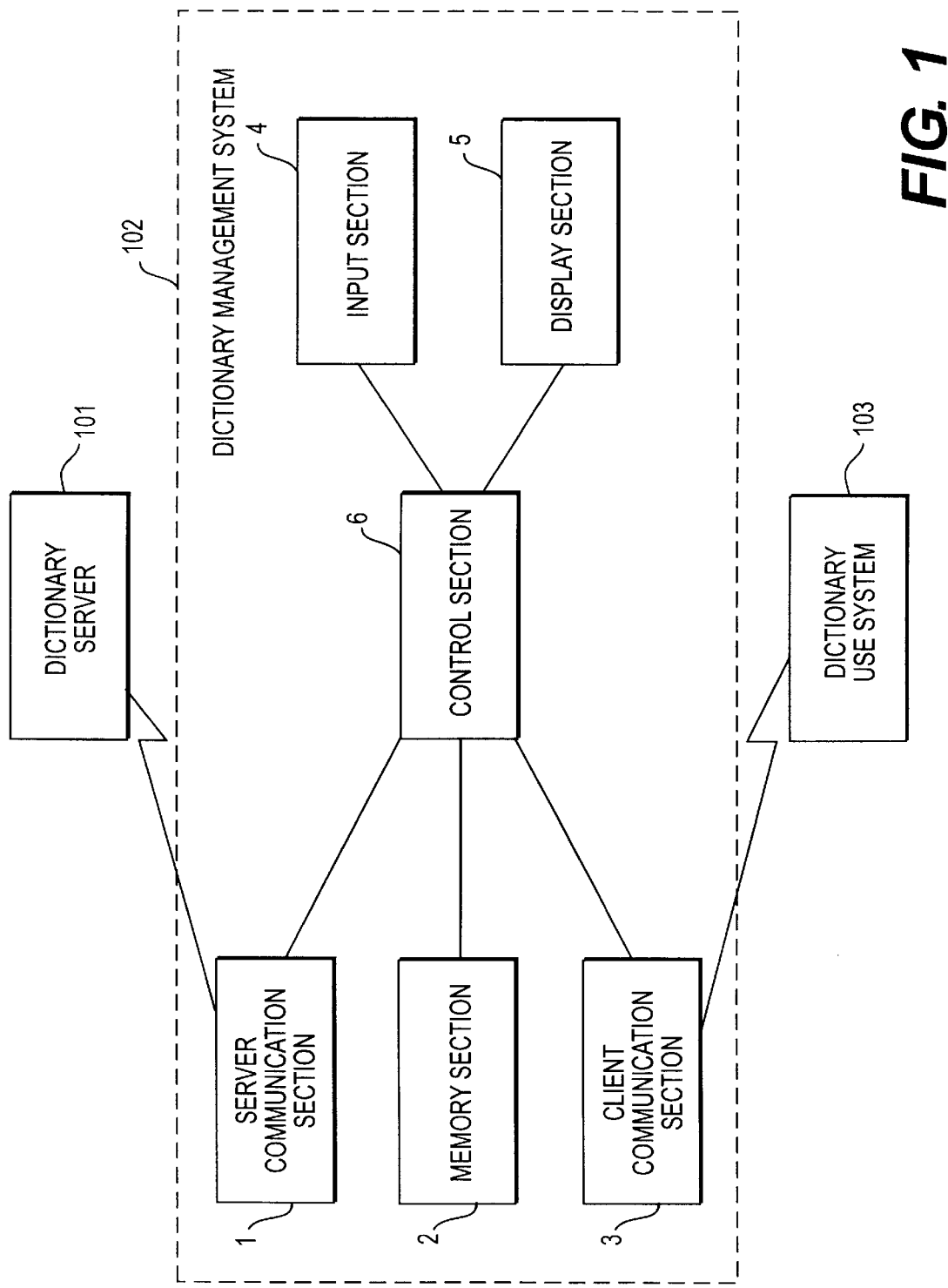
FIG. 1 is a block diagram of the dictionary management apparatus according to a first embodiment of the present invention.

FIG. 1 is a block diagram of the dictionary management apparatus according to the first embodiment of the present invention. The dictionary management system 102 is comprised of a server communication section 1, a memory section 2, a client communication section 3, an input section 4, a display section 5, a control section 6. Each section is composed as program group (dictionary management agent) executed by the computer. The server communication section 1 transmits data to the dictionary server 101 through Internet or Intranet. The memory section 2 stores the user set information for communication to the dictionary server 101, a communication log (for example, update time and quantity) of the dictionary data, if necessary, the dictionary data itself. The client communication section 3 transmits data to the dictionary use system 103 packaged in the computer of the dictionary management system 102. In this case, the dictionary use system is, for example, IME to input Japanese to the computer or MT (machine translation system) to translate the document. The input section 4 and the display section 5 are interface parts to the user. The user inputs the setting information related to communication to the dictionary server. The display section 5 outputs the communication log related to communication of the dictionary data.

Figure 2:
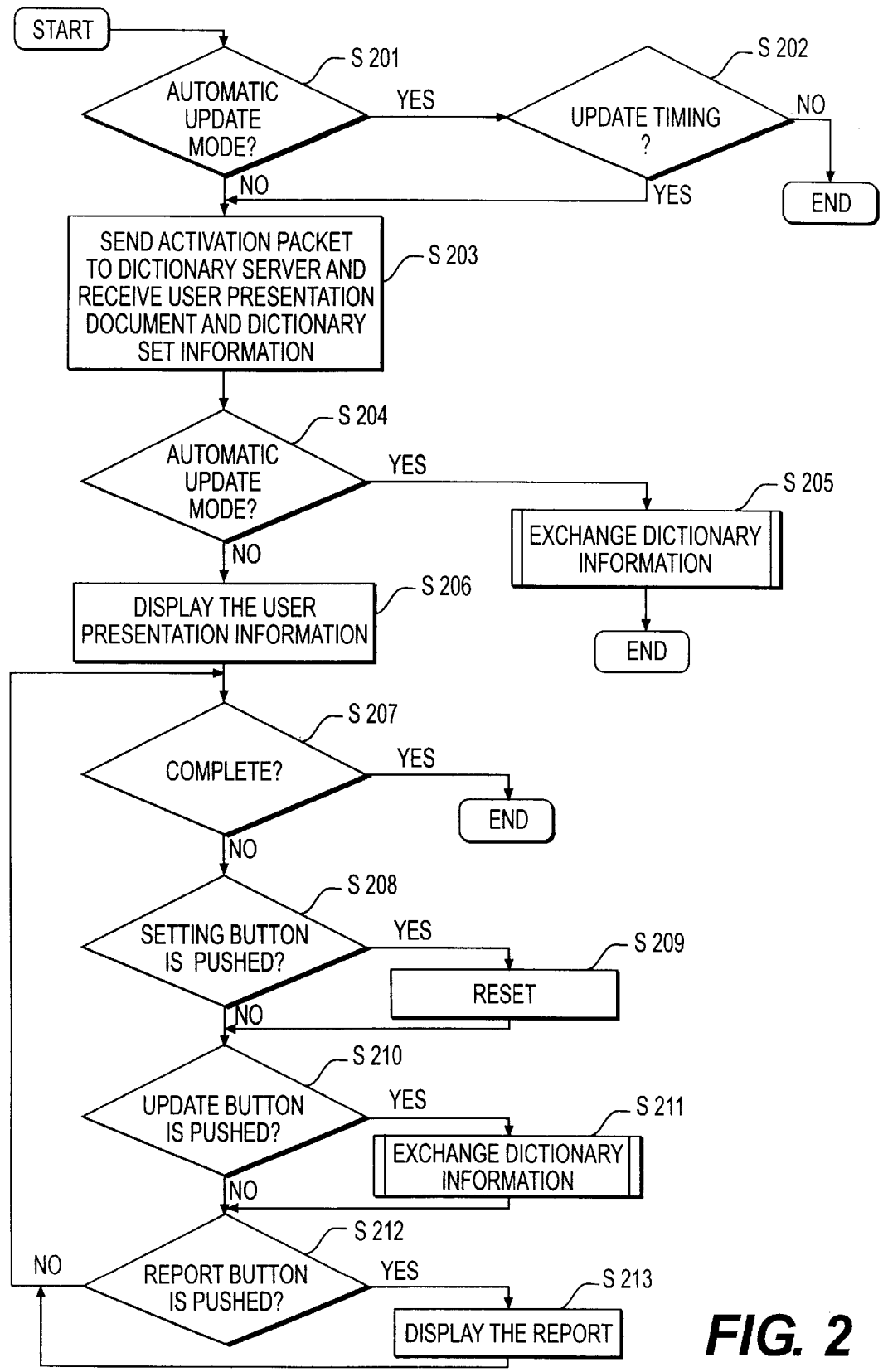
FIG. 2 is a flow chart of processing of the dictionary management apparatus according to the first embodiment of the present invention.
Figure 3:
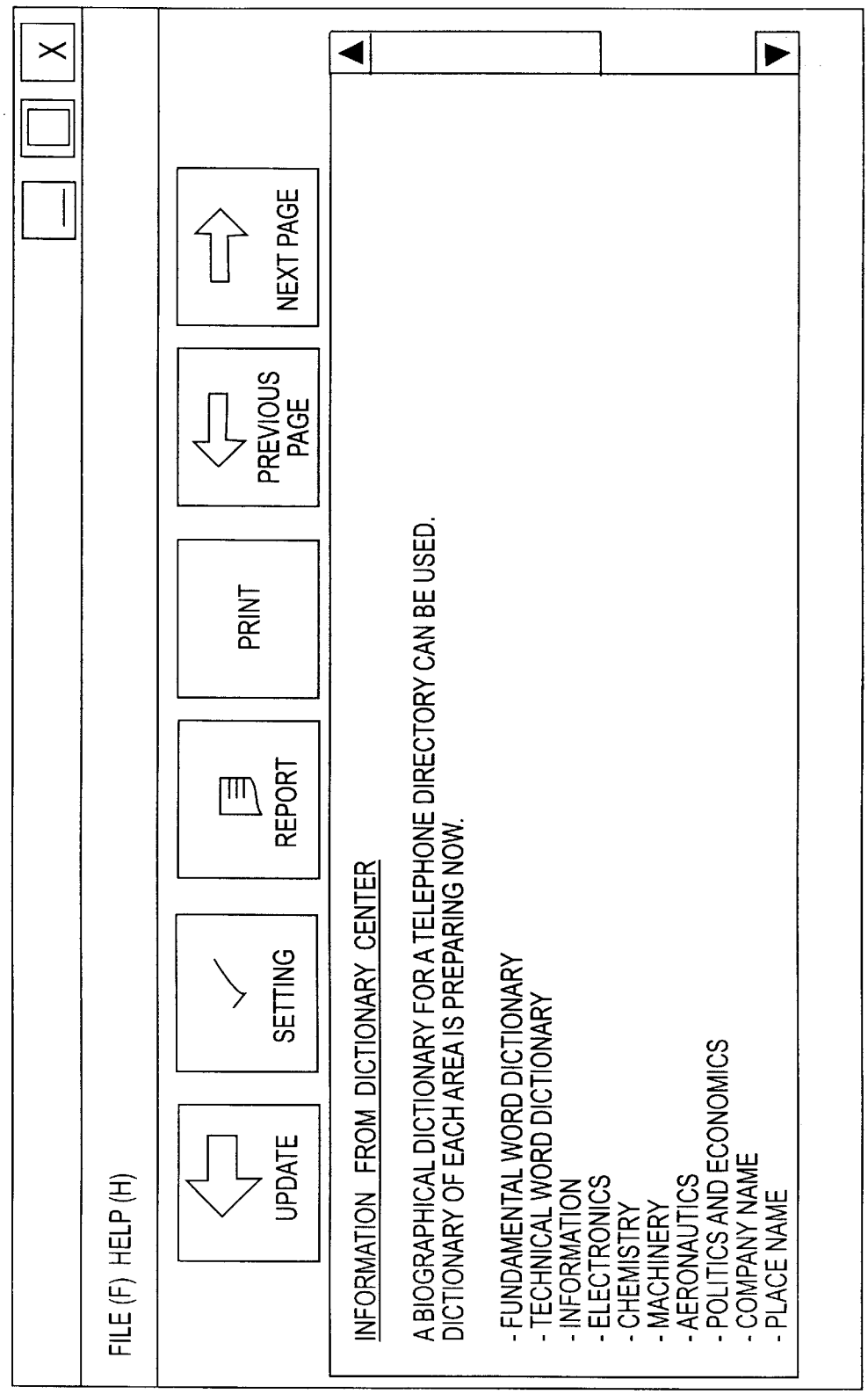
FIG. 3 is a schematic diagram of an example of the user presentation document on a display of the dictionary management apparatus.
Figure 4A:
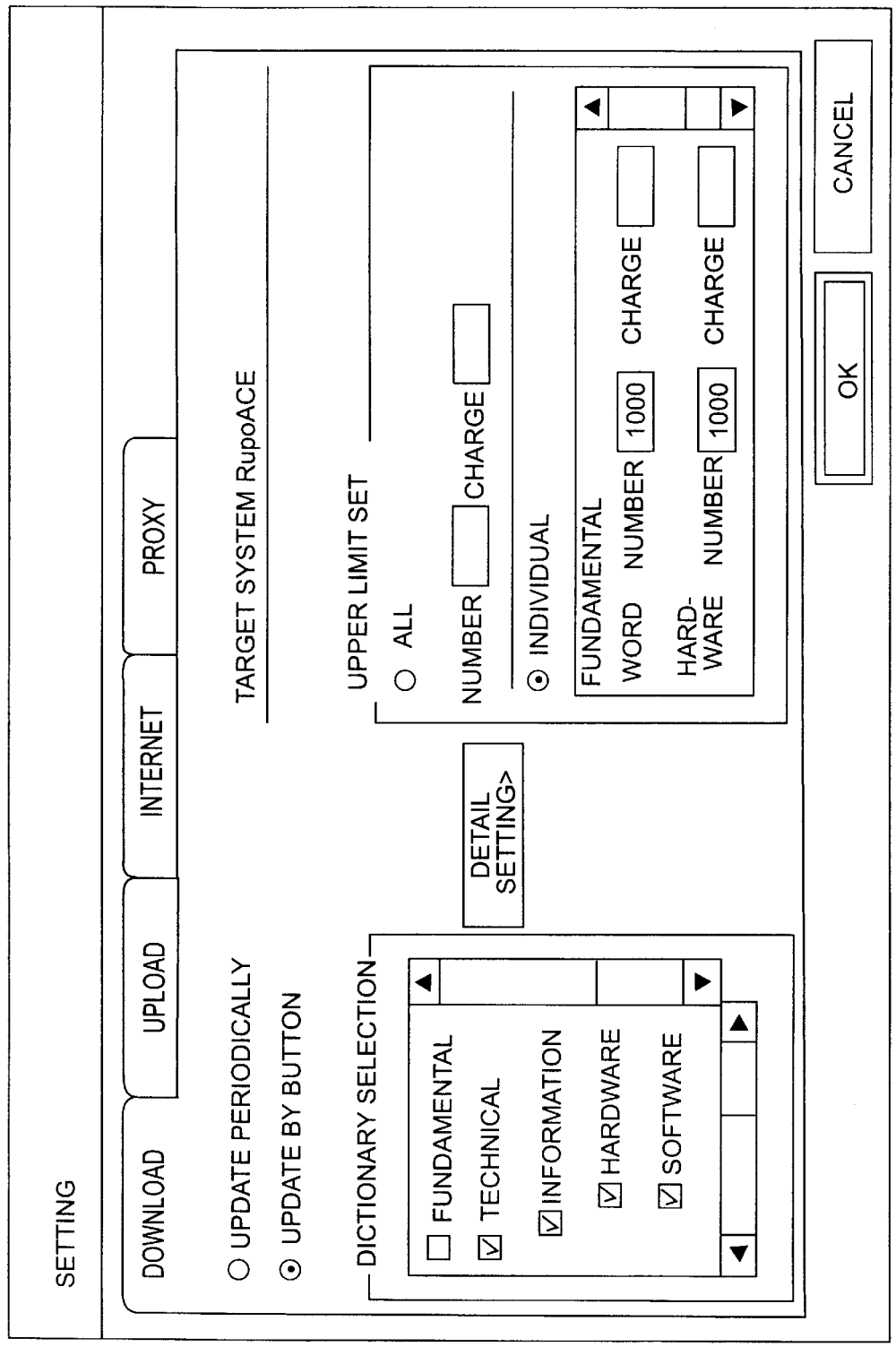
FIGS. 4A and 4B are schematic diagrams of examples of setting screen in the dictionary management apparatus.

The control section 6 controls each section 1~5 to execute predetermined action. FIG. 2 is a flow chart of processing of the control section 6. When the dictionary management apparatus 102 is firstly activated, the dictionary server 101 sends the user presentation document and the dictionary set information to the server communication section 1. In response to the receiving from the server communication section 1, the presentation section 5 outputs the user presentation document as shown in FIG. 3 (S201~S206). If the user pushes "SETTING" button in FIG. 3, the display section 5 outputs the setting screen as shown in FIG. 4A (S208). In this setting screen, a setting related to activation of the dictionary management apparatus is executed by the user. Accordingly, in case the user begins to use the dictionary management apparatus, he indicates necessary setting on the setting screen shown in FIG. 4A. This setting is executed by driving of the control section 6 for the input section 4 and the display section 5. In this case, the setting information is stored in the memory section 2 and the control section 6 controls activation of the dictionary management apparatus according to the setting information. FIG. 4A shows the content of the setting screen to download the dictionary data prepared in the dictionary server 101 to a particular dictionary use system. First, the user selects either "UPDATE PERIODICALLY" or "UPDATE BY BUTTON". In this case, the "UPDATE PERIODICALLY" represents that the dictionary server 101 is inquired for update information of the dictionary data to download for every predetermined term. The "UPDATE BY BUTTON" represents that the dictionary data is downloaded when the user pushes the update button in the screen shown in FIG. 3. Next, the user selects desired one from various dictionary sets in "DICTIONARY SET" in FIG. 4A. Each dictionary set is hierarchically composed such as "Technical word-Information-Hardware". If a button of high level hierarchy is selected, all dictionary set of low level hierarchy belonged to the selected button is also selected. Information of kind of the dictionary set and the hierarchical structure is sent by the dictionary server as the dictionary set information and dynamically displayed as menu shown in FIG. 4A. Furthermore, by pushing "DETAIL SETTING" button in FIG. 4A, quantity of the dictionary data to be downloaded is set to be restricted. In this case, the case to set an upper limit of quantity of the dictionary data to be downloaded is explained. The upper limit is set as number of word and charge of download. Object setting by the upper limit is selected as a dictionary set (individual button) or all dictionary sets (all button).

Figure 4B:
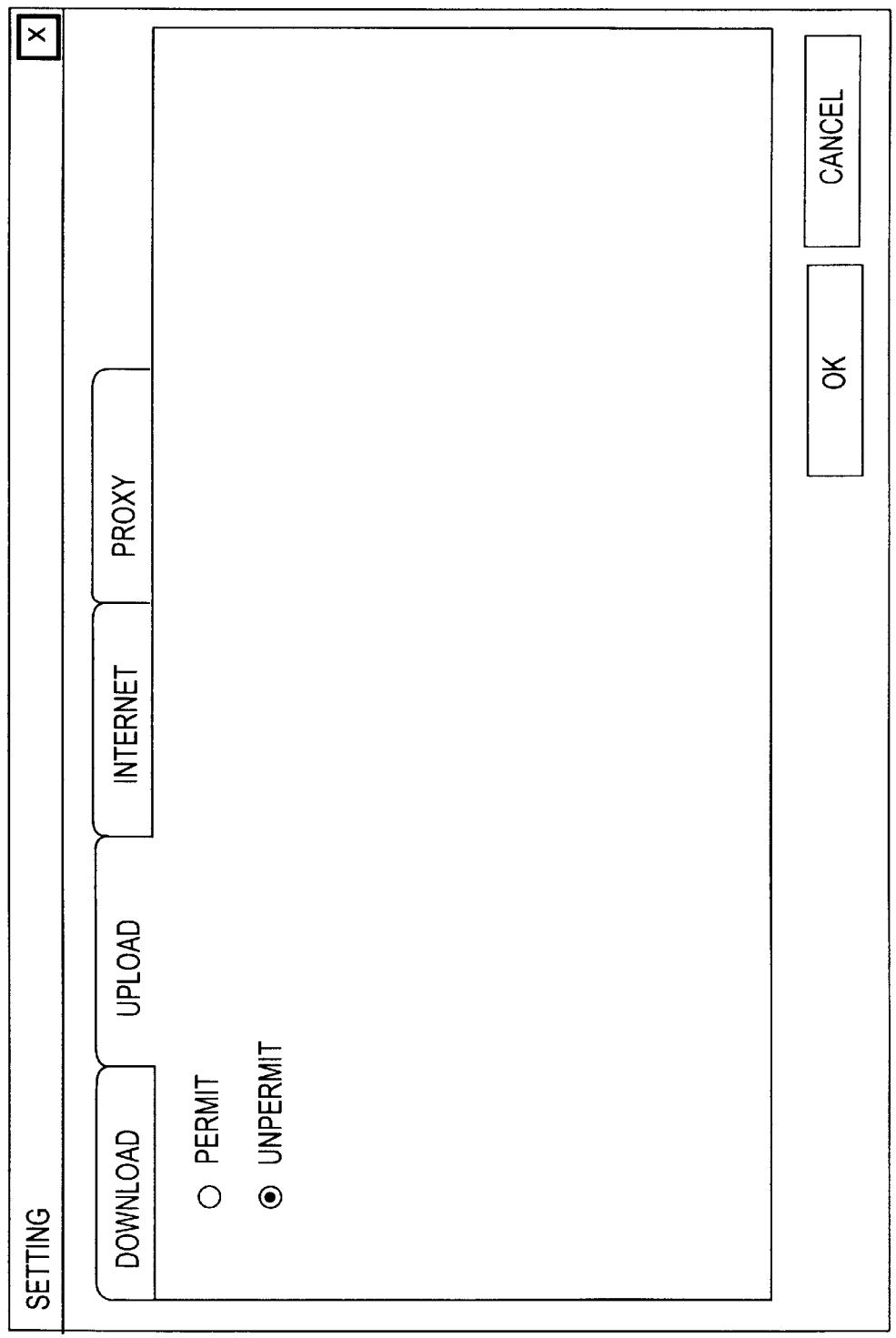

If "UPLOAD" is selected in the setting screen shown in FIG. 4A, second setting screen shown in FIG. 4B is displayed by the display section 5. This second setting screen represents setting menu to upload the user dictionary data registered in the dictionary use system 103 by the user to the dictionary server 101. The user selects either "PERMIT" or "UNPERMIT". In case of selecting the "PERMIT", the upload of the user dictionary data is automatically executed.

Figure 5A:
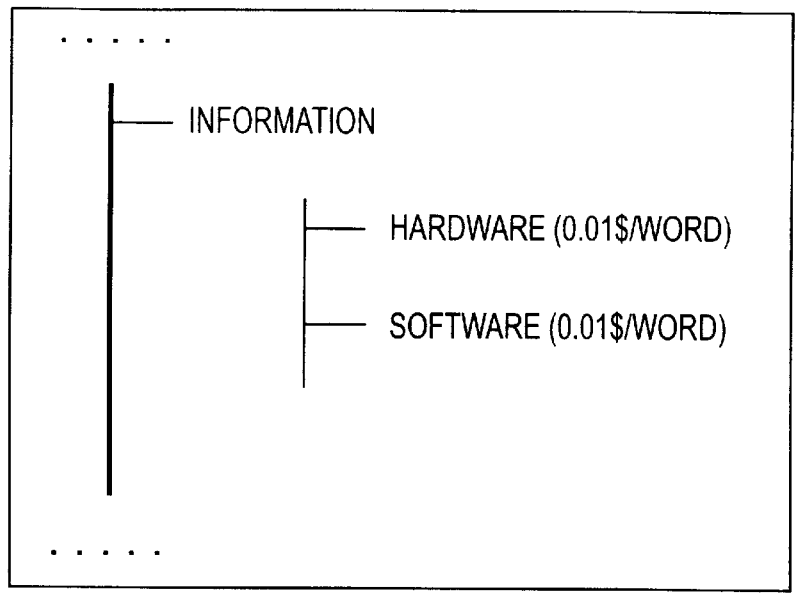
FIGS. 5A and 5B are schematic diagrams of examples of hierarchical structure and data structure of dictionary set information.
Figure 5B:
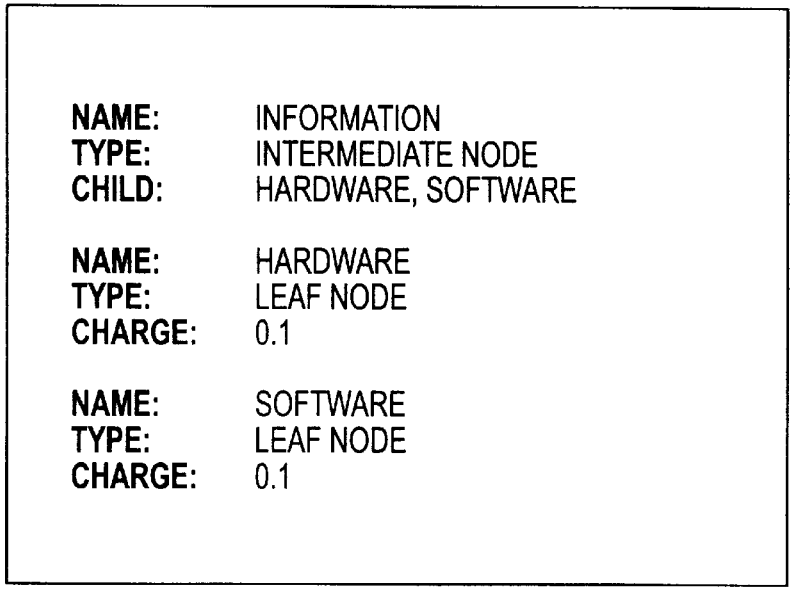

After above-mentioned initial setting is completed, this setting value is written in the memory section 2. When the dictionary management apparatus is activated again, normal activation of the dictionary management apparatus starts. First, by referring to the setting value in the memory section 2, the dictionary management apparatus 102 decides whether the automatic update mode is selected (S201). In case of the automatic update mode, the dictionary management apparatus 102 obtains a present time and decides whether the present time coincides with the update timing (S202). If the present time does not coincide with the update timing, the update processing is completed without further processing. Next, the dictionary management apparatus sends an activation packet to the dictionary server 101 to obtain the user presentation document and the dictionary set information (S203). The user presentation document is, for example, an information from a manager of the dictionary sever to an end user. The dictionary set information is data of the latest information of dictionary line-up available by the dictionary server. The dictionary set information is consisted of field hierarchy of the dictionary and use charge of each field dictionary. For example, in order to represent the dictionary set information shown in FIG. 5A, hierarchy data shown in FIG. 5B is used. In short, as information of field hierarchy of the dictionary, an item of "Type" represents "INTERMEDIATE NODE" or "LEAF NODE". As information of use charge, "charge" represents a fee per one word. As mentioned-above, the dictionary management apparatus 102 firstly receives the dictionary set information in FIG. 5B from the dictionary server 101. This reason is that, even if the dictionary line-up stored in the dictionary server 101 is changed, the dictionary management apparatus 102 can dynamically cope with the change of the dictionary line-up. Accordingly, the dictionary set information is stored in the memory section 2 and used to generate the download setting menu in FIG. 4A.

Figure 6:
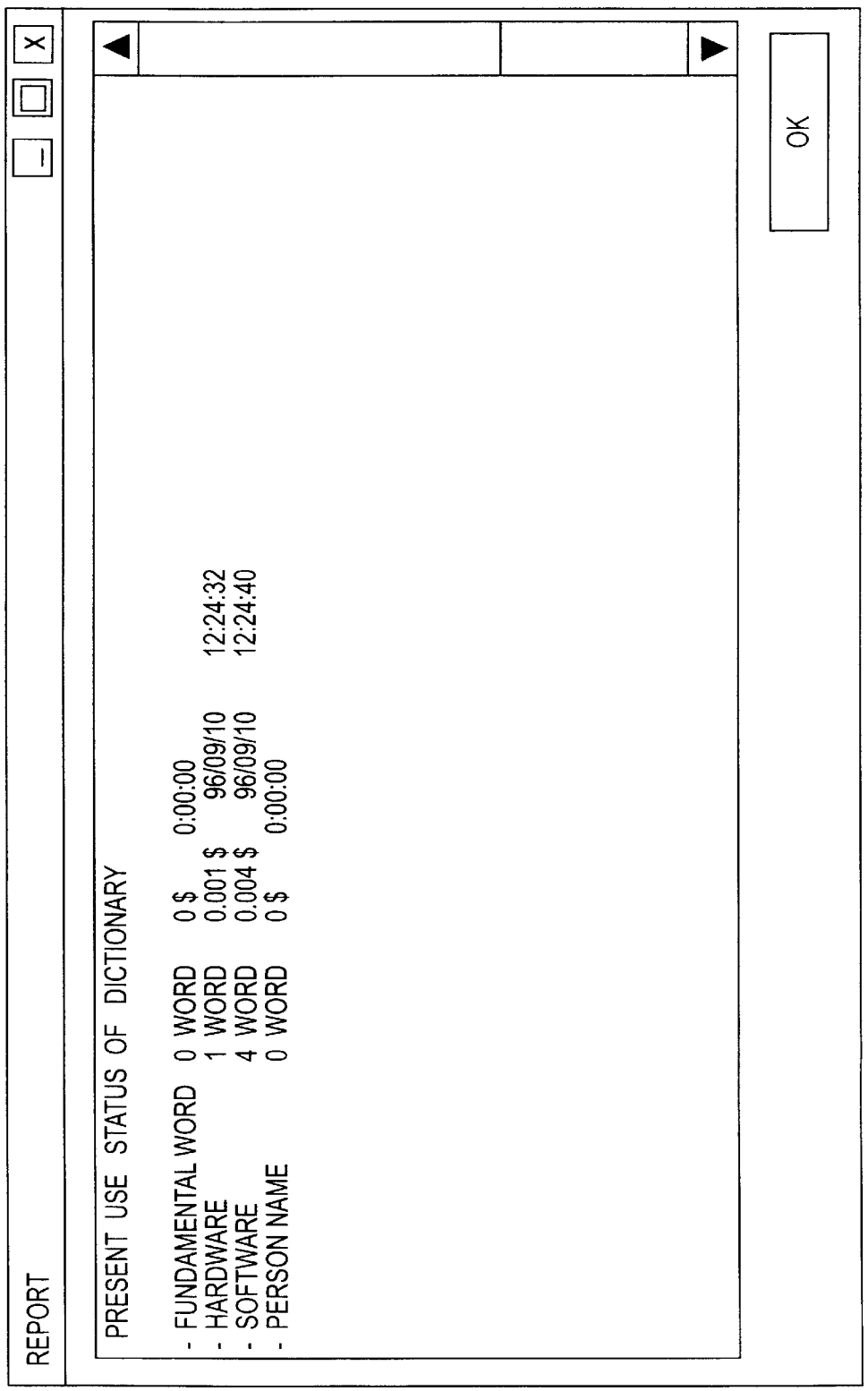
FIG. 6 is a schematic diagram of an example of report screen in the dictionary management apparatus.

Next, in case of the automatic update mode (S204), the dictionary management apparatus 102 exchanges the dictionary information to the dictionary server 101 and the dictionary use system 103 (S205) and the upload processing is completed. In this case, exchange of the dictionary information represents the download to update a dictionary of the dictionary use system 103 and the upload to update a dictionary of the dictionary server 101. In case of non-automatic update mode (S204), the user presentation document obtained at S203 is displayed by the presentation section 5 as shown in FIG. 3 (S206). Next, the dictionary management apparatus 102 waits the user's indication from the input section 4 (S207~S213). If the setting button is pushed (S208), a setting screen shown in FIG. 4A is displayed to urge the user to reset. The memory section 2 is updated by reset information (S209). In case of pushing "UPDATE" button (S210), the dictionary information is exchanged (S211). In case of pushing "REPORT" button (S212), by referring to the download log of the dictionary in the memory section 2, information of the number of word and the charge by unit of the dictionary set is displayed as shown in FIG. 6 (S213).

Figure 7:
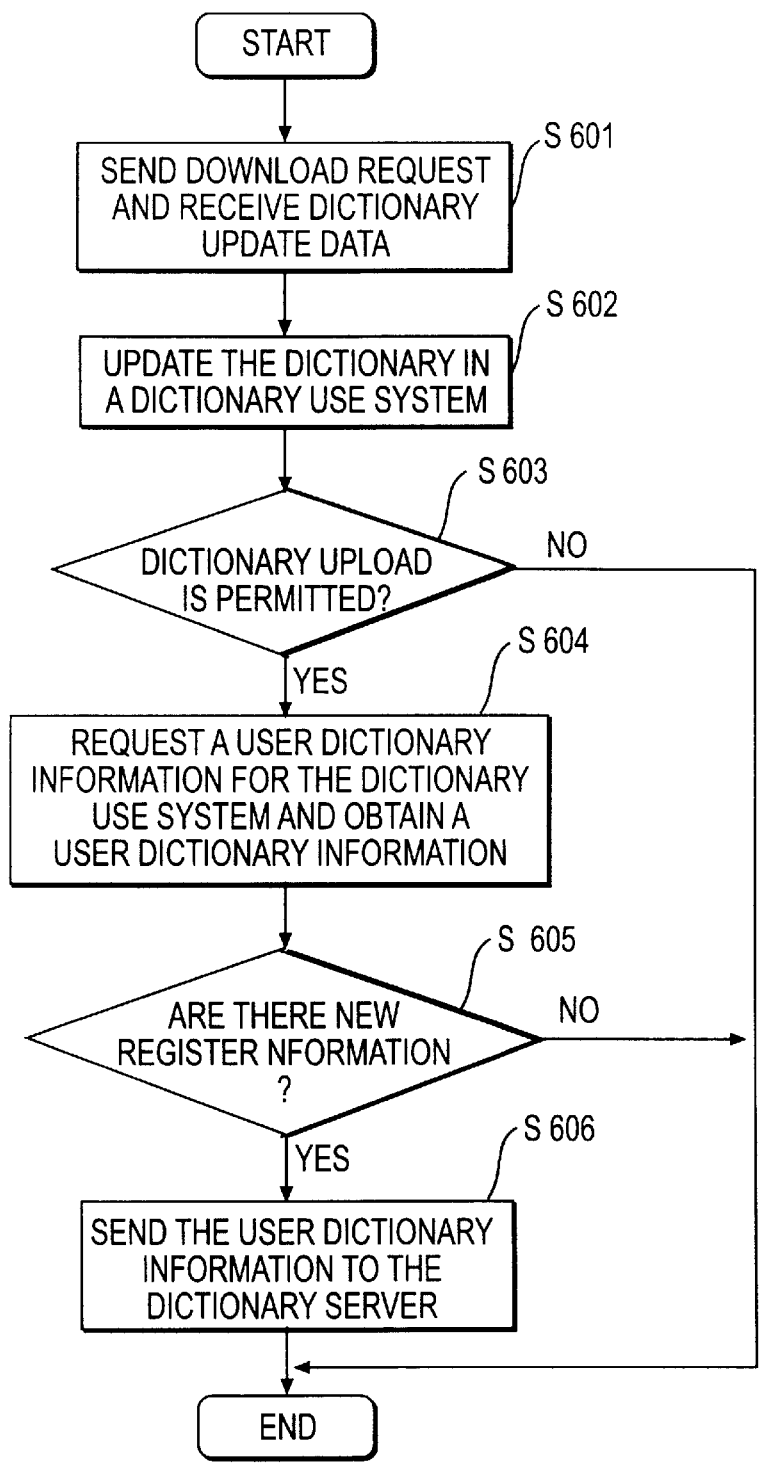
FIG. 7 is a flow chart of processing of dictionary update in the dictionary management apparatus according to the first embodiment of the present invention.

Next, the exchange processing of the dictionary information (S205) is explained by referring to the flow chart in FIG. 7. First, the dictionary management system 102 examines number of registered word by unit of the dictionary set by referring to the download log of the dictionary in the memory section 2 and informs the number of registered word to the dictionary server 101. At the same time, the dictionary management apparatus 102 examines the user's setting information and informs a name of the dictionary set and an upper limit of the number of download word to the dictionary server 101. The dictionary server 101 subtracts the downloaded dictionary data from the requested dictionary data as a new download dictionary data, and sends the new download dictionary data as a cryptograph to the dictionary management apparatus 102. The dictionary management apparatus 102 decodes the cryptograph to obtain the new download dictionary data (S601). Continuously, the dictionary management apparatus 102 sends the new download dictionary data to the dictionary use system 103 as a dictionary update information (S602). As shown in FIG. 8, the dictionary update information is consisted of an update flag ("a" as addition, "d" as deletion), a reading, a headword, a part of speech to add the latest vocabulary and delete a dead language. Furthermore, if the downloaded dictionary data includes a defect, this dictionary data is corrected by combination of deletion and addition. Next, the dictionary management apparatus 102 decides whether the upload is permissible by referring to the memory section 2 (S603). If the upload is permissible, the dictionary management apparatus 102 requests a list of new word registered by the user for the dictionary use system 103 and obtains the list (S604). In this case, a difference of the list between previous registered words and present registered words is desirable to be sent. However, the dictionary use system 103 does not normally store information to decide the difference such as registration time of the word. In this case, the dictionary management apparatus 102 obtains the list of the user registered word at the timing and the registration time from the dictionary use system 103. These informations are stored in the memory section 2. If the dictionary management apparatus 102 receives a present list of registered words from the dictionary use system 103, the dictionary management apparatus 102 compares the present list of registered words with a previous list of registered words, and calculates the difference list of the words registered between the present timing and the previous timing. In case the difference list exists (S605), the dictionary management apparatus 102 sends the difference list to the dictionary server 101 and receives a reception message from the dictionary server 101 (S606). In this way, the exchange processing of the dictionary data is completed.

If calculation power of the dictionary management apparatus 102 is low, the dictionary management apparatus 102 sends all lists of registered words to the dictionary server 101 without calculation of the difference list. The dictionary server 101 calculates the difference list of registered word. In this case, the load of the dictionary management apparatus 102 is reduced. However, communication quantity between the dictionary management apparatus 102 and the dictionary server 101 increases.

As a modification of the first embodiment, the dictionary use system may include a component of the dictionary management apparatus 102. In this case, the client communication section 3 is not necessary and the dictionary use system 103 directly drives the control section 6. As a result, the dictionary use system including a function of the dictionary management apparatus 102 is realized.

Figure 9:
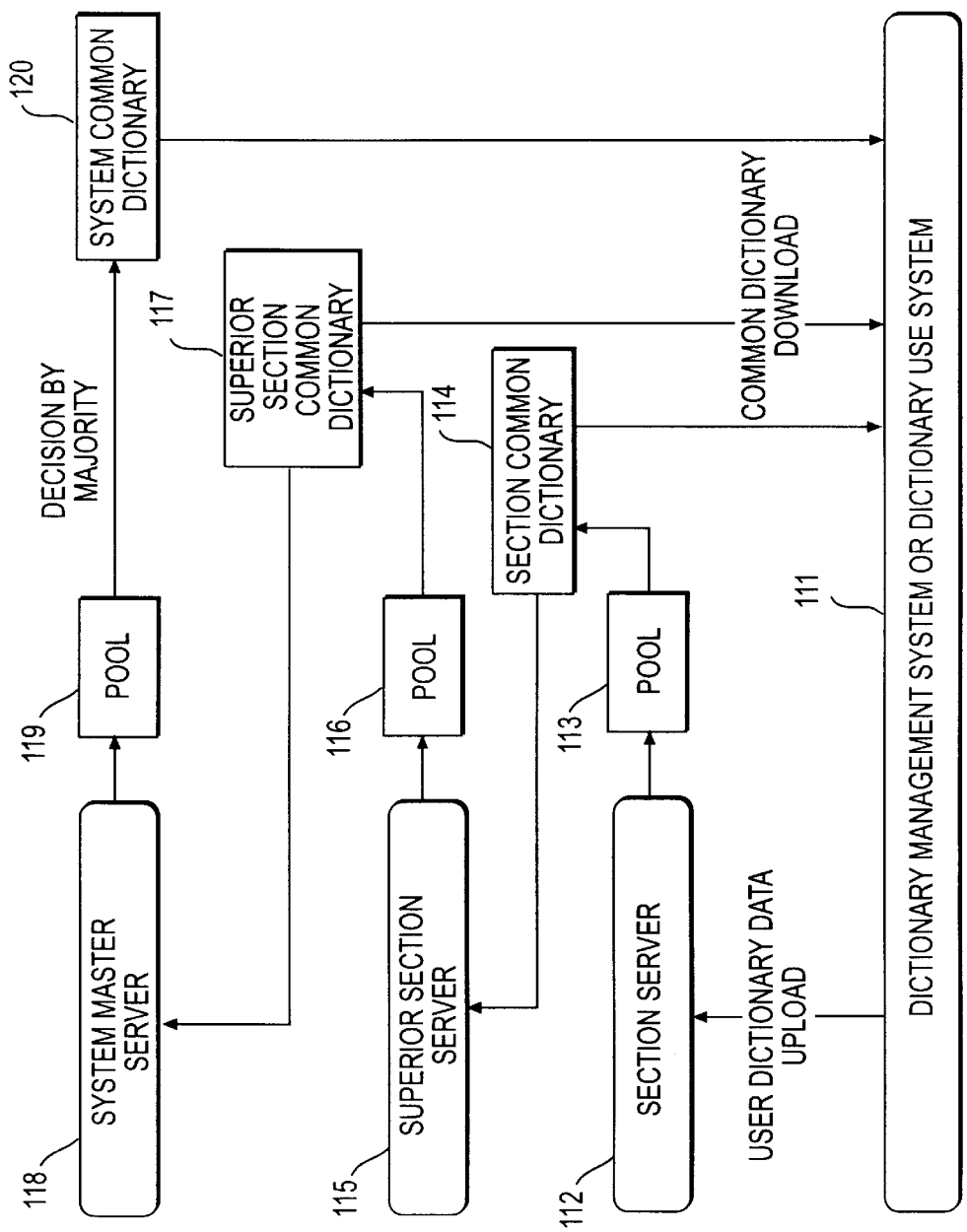
FIG. 9 is a schematic diagram of hierarchical structure of the dictionary server.

Next, the dictionary server of each level in hierarchical structure according to the second embodiment is explained. The dictionary server activates in cooperation with the dictionary management system and supplies the dictionary data prepared. In addition to this, the each dictionary server collects the dictionary information registered by the user from the dictionary management system (or low level dictionary server) and generates a common dictionary data from the all of collected dictionary data. The common dictionary data is supplied to each dictionary management system in order to commonly use the user dictionary information. FIG. 9 is a block diagram of hierarchical structure of each level of the dictionary server. As shown in FIG. 9, the dictionary server is hierarchically consisted of a section server 112, a superior section server 115, a system master server 118, in correspondence with each section of company system.

First, the dictionary management system 111 (or the dictionary use system) of the end user uploads the dictionary data registered by the user to the section server 112. The upload data is temporarily stored in a pool 113. The word whose storing frequency is high in the pool, i.e., the word which many users registered, is selected by a principle of majority decision. This selected words are registered in a section common dictionary 114. The section common dictionary 114 are supplied to the dictionary management system 111 and sent to the superior section server 115. The superior section server 115 collects the section common dictionary 114 from each section server 112 (In FIG. 9, one section server 112 is only shown). The collected section common dictionary 114 is temporarily stored in a pool 116. By using the principle of majority decision, sellected words are registered in a superior section common dictionary 117. The system master server 118 collects the superior section common dictionary 117 from each sperior section server 115 (In FIG. 9, one superior section server 115 is only shown). The collected superior section common dictionary 117 is temporality stored in a pool 117. By using the principle of majority decision, sellected words are registered in a system common dictionary 120. In this way, by composing each dictionary server in the hierarchical structure, the user can utilize not only the word commonly used in his section but also the word commonly used in the company.

Figure 10:
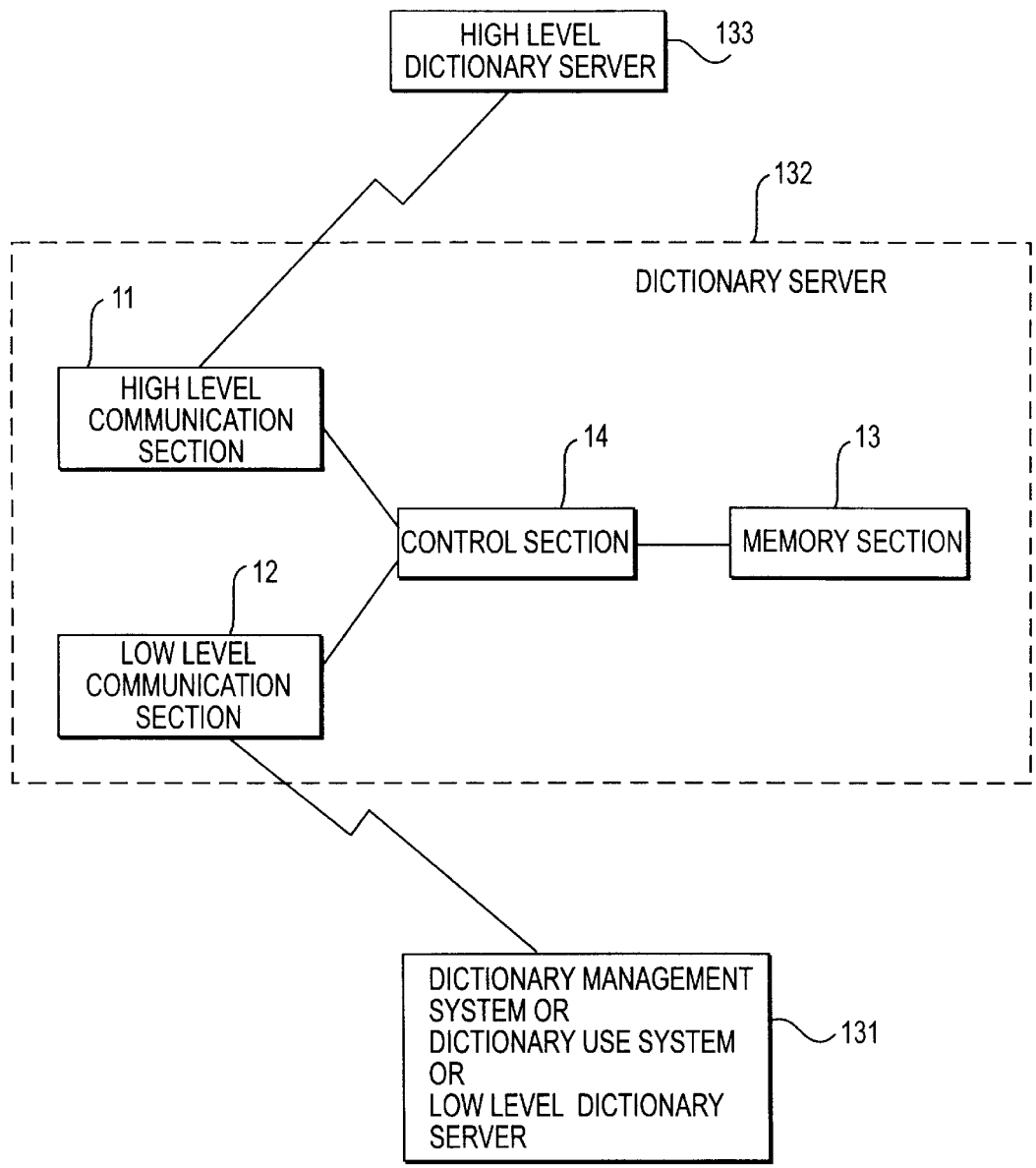
FIG. 10 is a block diagram of the dictionary server according to a second embodiment of the present invention.

Next, the construction of each of the dictionary servers in the hierarchical structure is explained. FIG. 10 is a block diagram of the dictionary server 132 as the section server 112, the superior section server 115, the system master server 118. In case of the hierarchical structure in FIG. 9, these three servers (the section server 112, the superior section server 115, the system master server 118) are respectively regarded as a leaf node, intermediate node, root node. Basically, these three servers includes same component and are activated by same algorithm. As shown in FIG. 10, the dictionary server 132 is consisted of a high level communication section 11, a low level communication section 12, a memory section 13, a control section 14. The high level communication section 11 requests an exchange of the dictionary data for a high level dictionary server 133 through Internet or Intranet, and receives the desired dictionary data. For example, in FIG. 9, the high level dictionary server is the superior section server 115 as for the section server 112 of the leaf node. The high level dictionary server is the system master server 118 as for the superior section server 115 of the intermediate node. The low level communication section 12 sends a desired dictionary data through a network in response to a request of the exchange of the dictionary data from the dictionary management system or a low level dictionary server. For example, in FIG. 9, the low level dictionary server is the section server 112 as for the superior section server 115 of the intermediate server. The low level dictionary server is the superior section server 115 as for the system master server 118 of the root server. As for the section server 112 of the leaf node, the other party to communicate through the low level communication section 12 is the dictionary management system 111 (or the dictionary use system). The memory section 13 stores the dictionary update data to be supplied to the low level dictionary server or the dictionary management system, and stores the upload data and the communication log of exchange of the dictionary data. The control section 14 controls each section 11~13 to execute predetermined activation.

The dictionary update data stored in the memory section 13 is managed as a file system. As shown in FIG. 11A, the file system includes directory structure corresponding to field hierarchy of the dictionary by unit of name of the dictionary use system (JAPANESE IME, SPEECH SYNTHESISER) as a target. The dictionary server of the root node manages the latest vocaburary (FUNDAMENTAL WORD, TECHNICAL WORD) prepared by a dictionary developer in addition to the system vocaburary (X COMPANY WORD) automatically collected from the dictionary management system. Other dictionary server reserves the latest status by periodically copying the file system of the root node to its file system. As shown in FIG. 11B, the dictionary update data and the dictionary set information are located at the leaf directory. Only the dictionary set information is located at the other directory. A file name of the dictionary update data is represented as "version number-patch number". The patch number "000" represents new additional vocaburary data and other patch number represents correction data for the additional vocaburary data of the version. In this place, the dictionary update data is represented as the list shown in FIG. 8. The dictionary set information is special file to define a type of the dictionary set and the use charge as shown in FIG. 5B. The dictionary server of the leaf node determines the dictionary data to send to the dictionary management system by referring to the file system.

Figure 12:
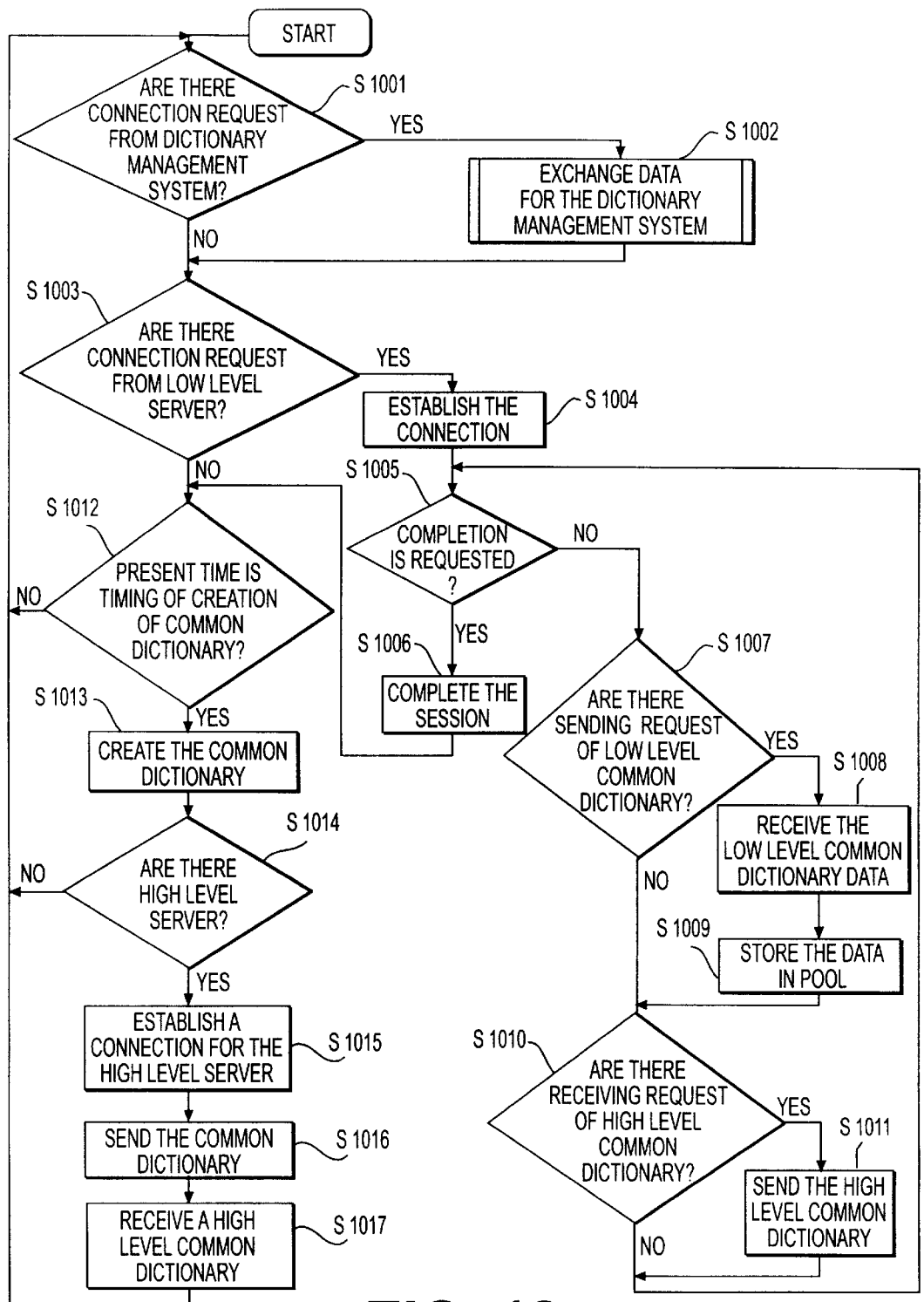
FIG. 12 is a flow chart of processing of the dictionary server according to the second embodiment of the present invention.

Next, FIG. 12 is a flow chart of processing of the dictionary server 132 according to the second embodiment. First, the dictionary server 132 checks the connection request from the dictionary management system (S1001). In case the connection request is received, the dictionary server 132 exchanges the data to the dictionary management system (S1002). If a particular dictionary server 132 has the low level dictionary server (for example, in case of the superior section server 115), the connection request is not received from the dictionary management system. Therefore, the processing is forwarded to next step. Next, the dictionary server 132 checks the connection request from the low level section server (S1003). If a particular dictionary server 132 is the leaf node of hierarchical structure (for example, in case of the section server 112), the connection request is not received from the low level section server. Therefore, the processing is forwarded to next step. In case the connection request is received from the low level section server, the connection is established between the dictionary server 132 and the low level section server (S1004). The dictionary server 132 sends the data to the low level dictionary server (for example, the section server 112 in case the dictionary server is the superior section server 115) according to the request (S1005~S1011). The dictionary server receives a sending request of a low level section common dictionary (for example, the low level section common dictionary is the section common dictionary 114 in case a particular dictionary server is the superior section dictionary server 115) from the low level dictionary server (S1007). The dictionary server receives a receiving request of a high level section common dictionary (for example, the high level section common dictionary is the superior section common dictionary 117 in case a particular dictionary server is the superior section dictionary server 115) from the low level dictionary server (S1010). When the dictionary server receives a completion request (S1005), a session to communicate to the low level dictionary server is completed (S1006).

In case the dictionary server receives the sending request of the low level section common dictionary from the low level dictionary server (for example, the low level section common dictionary is the section common dictionary 114 in case a particular dictionary server is the superior section server in FIG. 9) (S1007), the dictionary server receives the low level common dictionary data (S1008). If the low level section common dictionary data is received as a cryptograph, the dictionary server decodes the low level section common dictionary data. In this way, the low level section common dictionary data, a name of source server and a receiving time are stored in a pool of the memory section 13 (S1009).

In case the dictionary server receives the receiving request of the high level section common dictionary from the low level dictionary server (for example, the high level section common dictionary is the superior section common dictionary 117 in case a particular dictionary server is the superior section server 115 in FIG. 9) (S1010), the dictionary server codes the high level section common dictionary as cryptograph if necessary. In this way, the high level section common dictionary is sent to the low level dictionary server (for example, the low level dictionary server is the section server 112 in case a particular dictionary server is the superior section server 115 in FIG. 9) (S1011).

Next, the dictionary server decides whether a present time coincides with the update timing preset in the memory section 13 (S1012). If the present time coincides with the update timing, following processing is executed. First, the dictionary server decides identity of each entry of the dictionary data by comparing each dictionary data. A plurality of entry each of which the dictionary data is same is merged as one entry and stored as one dictionary entry with frequency (appearance count). For example, in case of Japanese Input IME, a plurality of entry in which readings, headwords, parts of speech are same is decided to be identified. Next, the dictionary entry whose frequency is above a threshold is extracted. Then, a list of extracted dictionary entry is compared with the dictionary entry of the particular common dictionary created at a previous timing. In this way, a difference file of the dictionary entry between the present timing and the previous timing is generated and stored in the memory section 13 as a new common dictionary of a particular level (S1013).

Next, the dictionary server confirms whether a high level dictionary server exists (for example, the high level dictionary server is the system master server 118 in case a particular dictionary server is the superior section server 115 in FIG. 9) (S1014). If the particular dictionary server is the root node, following processing is not executed because the higher level dictionary server does not exist. If the high level dictionary server exists, a connection is established to the high level dictionary server through the high level communication section 11 in FIG. 10 (S1015). The common dictionary of this level generated at previous step is sent to the high level dictionary server (S1016). Furthermore, the dictionary server receives a high level section common dictionary from the high level dictionary server (for example, the high level section common dictionary is the system common dictionary 120 in case a particular dictionary server is the superior section server 115 in FIG. 9). The high level section common dictionary is stored in the memory section (S1017). This high level section common dictionary is referred by the dictionary server to determine the dictionary data to be supplied to the low level dictionary server or the dictionary management system.

Figure 13:
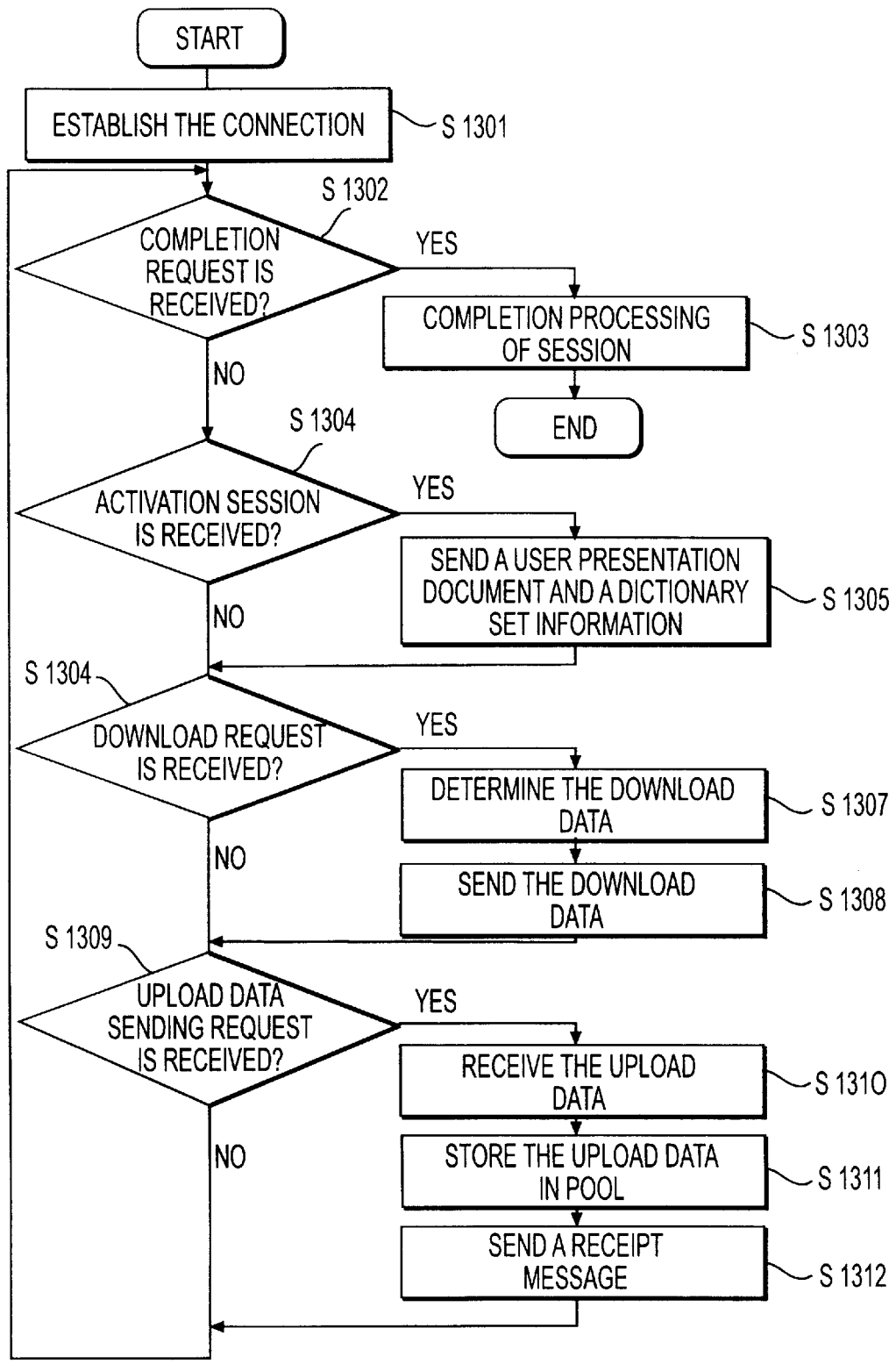
FIG. 13 is a flow chart of data exchange processing between the dictionary management apparatus and the dictionary server according to the second embodiment of the present invention.

Next, the data exchange to the dictionary management system at step S1002 is explained. FIG. 13 is a flow chart of processing of the data exchange in the dictionary server according to the second embodiment. First, the dictionary server 132 (for example, the section server 112 as the leaf node) establishes a connection to the dictionary management system through the low level communication section 12 (S1301) and waits for the request from the dictionary management system 131 (S1302~S1312). In this situation, when the dictionary server 132 receives an activation packet from the dictionary management system 131 (S1304), the dictionary server 132 sends a user presentation document and the dictionary set information to the dictionary management system 131 (S1305). When the dictionary server 132 receives a download request from the dictionary management system 131 (S1304), the dictionary server 132 determines the dictionary data to be downloaded (which directory, which file, number of words) by referring to the dictionary set name, and the upper limit of number of words received from the dictionary management system 131 (S1307). In this way, the dictionary data determined as download data is sent to the dictionary management system 131 (S1308). When the dictionary server 132 receives an upload request from the dictionary management system 131 (S1309), the dictionary server 132 receives the dictionary data uploaded by the dictionary management system 131 (S1310), stores the dictionary data in a pool of the memory section 13 (S1311) and sends a receipt message to the dictionary management system (S1312). When the dictionary server 132 receives a completion request from the dictionary management system 131 (S1302), a session to the dictionary management system is completed (S1303).

The above-mentioned algorithm is applicable to each server of the root node, the middle node, the leaf node. FIG. 9 shows three levels of the server hierarchy structure. However, a plurality of the intermediate nodes may be generally applied in the server hierarchy structure. Furthermore, the intermediate node is not always necessary. Even if the root node is same as the leaf node, i.e., only one server, the above-mentioned algorithm is applicable.

In the second embodiment, the server of each level respectively generates the common dictionary of its level. However, the root server (for example, the system master server 118 in FIG. 9) may generate the common dictionaries of all levels. In this case, the intermediate server and the leaf server respectively transmit each pool with identifier to the root server. The root server only generates the common dictionary of each level by the principle of majority decision and concentrically manages all common dictionaries. The intermediate server and the leaf server selectively copy the common dictionary of each level from the root server.

In this way, by hierarchical structure of the dictionary server, maintenance of the dictionary is easier than distributed management. However, if a connection from the low level server to the root node is impossible by a communication trouble, the low level server can not update the common dictionary of this level. In the second embodiment, each server reserves its file system. However, by using NFS (Network File System) mount, the file system may be shared between a plurality of servers. In this case, the file system is not copied. Therefore, memory capacity is reduced and processing speed grows up. However, when the dictionary developer corrects the dictionary entry in the file system, such shared file system might be confusing to the developer.

As mentioned-above, in the second embodiment, the latest vocaburary data prepared by the dictionary developer is located in the highest level dictionary server. This latest vocaburary data is transmitted to the low level dictionary server in order. Lastly, the latest vocaburary data is supplied to the user's dictionary use system through the dictionary management system. Furthermore, when the user registers his desired vocaburary to the dictionary use system as a user dictionary data, the user dictionary data is sent to the lowest level dictionary server through the dictionary management system. The dictionary server of each level newly generates the section or superior section common dictionary by using the user dictionary data. When the user dictionary data is supplied to the highest level dictionary data, the highest level dictionary data generates the system common dictionary by using the user dictionary data. This system common dictionary is transmitted to the low level dictionary server in order. Lastly, the system common dictionary is supplied to the user's dictionary use system through the dictionary management system. As a result, in the present invention, supply of the latest vocaburary is automatically executed between the dictionary use system and the highest level dictionary server.

In the prior art, the user of the dictionary use system must register the latest vocabulary or the company vocabulary by his load. However, in the present invention, these vocabularies are immediately and automatically supplied to the dictionary use system. Therefore, the user dictionary of the dictionary use system is always under a status for the user to use the latest vocabulary. As a result, a quality maintenance and a high precision of the dictionary use system are realized. Furthermore, the company vocabulary is shared by all employees (users) in the company. Accordingly, the load of each user for registration is greatly reduced.

A memory can be used to store instructions for performing the process of the present invention described above, such a memory can be a hard disk, semiconductor memory, and so on.

Other embodiment of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A dictionary management apparatus which updates a dictionary included in a language processing system, the dictionary management apparatus communicating between a dictionary server and the language processing system for download and upload, the dictionary server storing dictionary data to be supplied to the language processing system, comprising:

request means for requesting download of the dictionary data according to a user's request or a predetermined timing;

update means for updating the dictionary of the language processing system according to the dictionary data downloaded from the dictionary server;

collection means, if the upload from the language processing system to the dictionary server is previously permissible, for obtaining the dictionary data in the dictionary of the language processing system, and for deciding whether the obtained dictionary data includes new dictionary data registered by the user; and upload means, if the obtained dictionary data includes new dictionary data, for sending the new dictionary data to the dictionary server as upload data.

2. The dictionary management apparatus according to claim 1, wherein said request means receives a user presentation document and a dictionary set information sent by the dictionary server in response to the download request, the user presentation document relates to the dictionary data downloaded by the dictionary server and the dictionary set information represents a present status of the dictionary data in the dictionary server.

3. The dictionary management apparatus according to claim 2, further comprising an output means for outputting the user presentation document, and for outputting the dictionary set information for the user to indicate the condition of download and upload.

4. The dictionary management apparatus according to claim 3, further comprising an input means for inputting the condition of download including an update mode, dictionary selection, number of words, charge, and for inputting the condition of upload as for permission.

5. The dictionary management apparatus according to claim 4, wherein said update means updates the dictionary of the language processing system when a present time coincides with an update timing in case of an automatic update mode.

6. The dictionary management apparatus according to claim 4, wherein said update means updates the dictionary of the language processing system when update indication is inputted through said input means in case of a manual update mode.

7. The dictionary management apparatus according to claim 4, wherein said request means requests the download of the dictionary data to the dictionary server within the limits of the condition of download.

8. The dictionary management apparatus according to claim 7, wherein said collection means collects the user dictionary data from the dictionary of the language processing system if the upload is indicated as permission through said input means.

9. A dictionary management method for updating a dictionary included in a language processing system and for communicating between a dictionary server and the language processing system for download and upload, the dictionary server storing dictionary data to be supplied to the language processing system, comprising the steps of:

requesting download of the dictionary data for the dictionary server according to a user's request or a predetermined timing;

updating the dictionary of the language processing system according to the dictionary data downloaded from the dictionary server;

obtaining the dictionary data in the dictionary of the language processing system if the upload from the language processing system to the dictionary server is previously permissible;

deciding whether the obtained dictionary data includes new dictionary data registered by the user; and sending the new dictionary data to the dictionary server as update data if the obtained dictionary data includes the new dictionary data.

10. A computer readable memory containing computer readable instructions to update a dictionary included in a language processing system and to communicate between a dictionary server and the language processing system for download and upload, the dictionary server storing dictionary data to be supplied to the language processing system, comprising:

instruction means for causing a computer to request download of the dictionary data for the dictionary server according to a user's request or a predetermined timing;

instruction means for causing a computer to update the dictionary of the language processing system according to the dictionary data downloaded from the dictionary server;

instruction means for causing a computer to obtain the dictionary data in the dictionary of the language processing system if the upload from the language processing system to the dictionary server is previously permissible;

instruction means for causing a computer to decide whether the obtained dictionary data includes new dictionary data registered by the user; and instruction means for causing a computer to send the new dictionary data to the dictionary server as update data if the obtained dictionary data includes the new dictionary data.

11. A dictionary server system having at least two hierarchical levels, the dictionary server system including a plurality of low level dictionary servers associated with a high level dictionary server, each low level dictionary server communicating with a plurality of dictionary management systems, each low level dictionary server comprising:

low level receiving means for receiving dictionary data updated in each dictionary of the plurality of dictionary management systems as upload data; and low level sending means for sending the upload data whose frequency is above a predetermined value to the high level dictionary server as updated low level dictionary data;

said high level dictionary server comprising:

high level receiving means for receiving the updated low level dictionary data from the plurality of low level dictionary servers; and high level sending means for sending received dictionary data whose frequency is above the predetermined value to the plurality of low level dictionary servers as updated high level dictionary data;

wherein, in each low level dictionary server, said low level receiving means receives the updated high level dictionary data from the high level dictionary server; and said low level sending means selectively sends the updated low level dictionary data and the updated high level dictionary data to at least one dictionary management system in response to a download request from the at least one dictionary management system.

12. The dictionary server system according to claim 11, wherein each low level dictionary server further comprises a memory means for storing the updated low level dictionary data and the updated high level dictionary data.

13. The dictionary server system according to claim 12, wherein said memory means stores dictionary set information including a dictionary name of each level representing the stored updated dictionary data.

14. The dictionary server system according to claim 13, wherein said low level sending means sends the dictionary set information to the plurality of dictionary management systems to generate a download setting menu for a user.

15. The dictionary server system according to claim 14, wherein said low level sending means selects updated dictionary data corresponding to a user's selected level included in the download request, and sends the updated dictionary data to the at least one dictionary management system.

16. The dictionary server system according to claim 11, wherein said low level sending means and said high level sending means extract updated dictionary data whose frequency is above the predetermined value from received dictionary data whenever a present time coincides with an update timing.

17. The dictionary server system according to claim 11, further including a plurality of middle level dictionary servers associated with the high level dictionary server, a plurality of the low level dictionary servers associated with each of the plurality of middle level dictionary servers, each middle level dictionary server comprising:

middle level receiving means for receiving the updated low level dictionary data from the plurality of the low level dictionary servers associated with the middle level dictionary server; and middle level sending means for sending received dictionary data whose frequency is above the predetermined value to the high level dictionary server as updated middle level dictionary data.

18. The dictionary server system according to claim 17, wherein in each middle level dictionary server, said middle level receiving means receives the updated high level dictionary data from the high level dictionary server, and said middle level sending means sends the updated middle level dictionary data and the updated high level dictionary data to the plurality of the low level dictionary servers associated with the middle level dictionary server.

19. The dictionary server system according to claim 18, wherein said memory means stores the updated low level dictionary data, the updated middle level dictionary data, and the updated high level dictionary data.

20. A method for controlling a dictionary server system having at least two hierarchical levels, the dictionary server system including a plurality of low level dictionary servers associated with a high level dictionary server, each low level dictionary server communicating with a plurality of dictionary management systems, comprising the steps of:

in each low level dictionary server, receiving dictionary data updated in each dictionary of the plurality of dictionary management systems as upload data; and sending the upload data whose frequency is above a predetermined value to the high level dictionary server as updated low level dictionary data;

in the high level dictionary server, receiving the updated low level dictionary data from the plurality of low level dictionary servers; and sending received dictionary data whose frequency is above the predetermined value to the plurality of low level dictionary servers as updated high level dictionary data; and in each low level dictionary server, receiving the updated high level dictionary data from the high level dictionary server; and selectively sending the updated low level dictionary data and the updated high level dictionary data to at least one dictionary management system in response to a download request from the at least one dictionary management system.

21. A computer readable memory containing computer readable instructions to control a dictionary server system having at least two hierarchical levels, the dictionary server system including a plurality of low level dictionary servers associated with a high level dictionary server, each low level dictionary server communicating with a plurality of dictionary management systems, comprising:

each low level dictionary server comprising:
instruction means for causing a computer to receive dictionary data updated in each dictionary of the plurality of dictionary management systems as upload data; and
instruction means for causing a computer to send upload data whose frequency is above a predetermined value to the high level dictionary server as updated low level dictionary data;

the high level dictionary server comprising:
instruction means for causing a computer to receive the updated low level dictionary data from the plurality of low level dictionary servers; and
instruction means for causing a computer to send received dictionary data whose frequency is above the predetermined value to the plurality of low level dictionary servers as updated high level dictionary data;

wherein each low level dictionary server further comprises:
instruction means for causing a computer to receive the updated high level dictionary data from the high level dictionary server; and
instruction means for causing a computer to selectively send the updated low level dictionary data and the updated high level dictionary data to at least one dictionary management system in response to a download request from the at least one dictionary management system.

* * * * *